United States Patent [19]

Clapp

[11] 4,366,640
[45] Jan. 4, 1983

[54] FISHING ROD HOLDER

[76] Inventor: Guy C. Clapp, P.O. Box 3632, Arlington, Tex. 76017

[21] Appl. No.: 173,877

[22] Filed: Jul. 31, 1980

[51] Int. Cl.³ .......................................... A01K 97/10
[52] U.S. Cl. ...................................................... 43/21.2
[58] Field of Search ........................................ 43/21.2

[56] References Cited

U.S. PATENT DOCUMENTS

| | | | |
|---|---|---|---|
| 1,025,657 | 5/1912 | Towne | 43/21.2 |
| 2,314,747 | 3/1943 | White | 43/21.2 |
| 2,499,821 | 3/1950 | Geisheimer | 43/21.2 |
| 2,621,877 | 12/1952 | Grigsby | 43/21.2 |
| 2,624,536 | 1/1953 | Herzog | 43/21.2 |
| 2,657,492 | 11/1953 | Skorr | 43/21.2 |
| 2,680,924 | 6/1954 | Menegay | 43/21.2 |
| 3,058,251 | 10/1962 | Brooks | 43/21.2 |
| 3,444,643 | 5/1969 | Dobbs | 43/21.2 |
| 3,783,548 | 1/1974 | Fisher | 43/21.2 |

FOREIGN PATENT DOCUMENTS

| | | | |
|---|---|---|---|
| 519881 | 12/1955 | Canada | 43/21.2 |
| 2222011 | 10/1974 | France | 43/21.2 |
| 181118 | 10/1962 | Sweden | 43/21.2 |

*Primary Examiner*—Stephen G. Kunin
*Assistant Examiner*—J. T. Zatarga
*Attorney, Agent, or Firm*—Richards, Harris & Medlock

[57] ABSTRACT

A fishing rod holder assembly (10) is provided for attachment to the side of a boat (14) or the like. The assembly (10) comprises a base (18) of a size and shape to be mounted in a recess position in the side of a boat and a rod engaging body (16) releasably attached to the base by a clamping assembly (19). The body has a socket portion (46) for engaging the pistol grip of the rod. The body (16) varies in thickness in the area engaging the assembly (19).

2 Claims, 5 Drawing Figures

U.S. Patent    Jan. 4, 1983    4,366,640
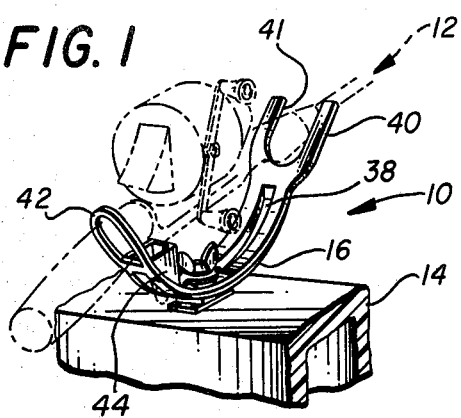
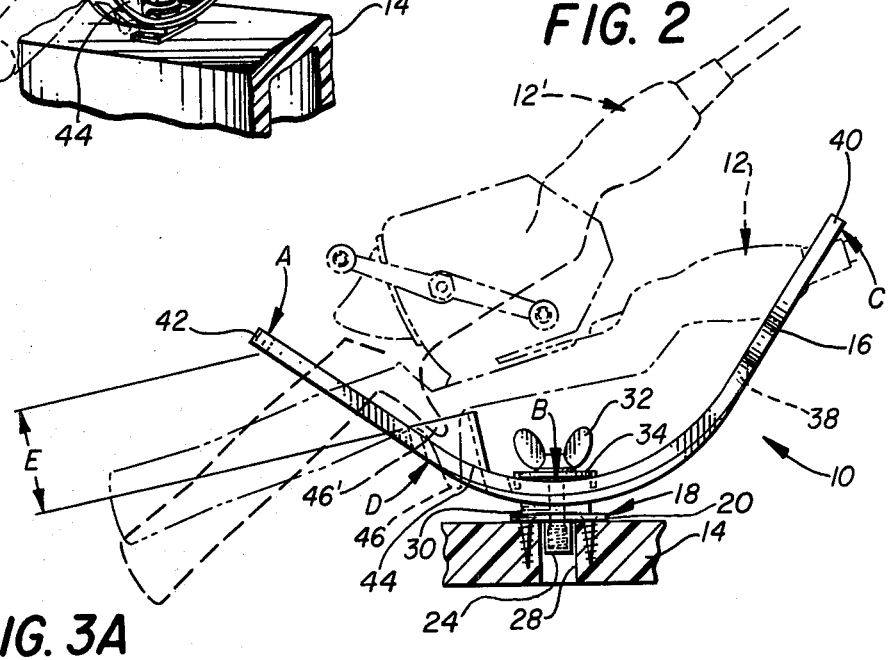
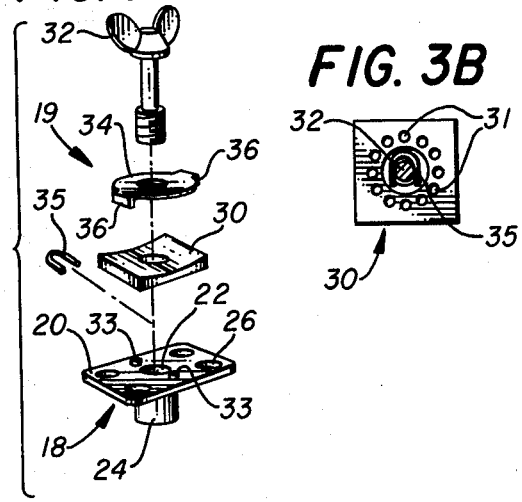
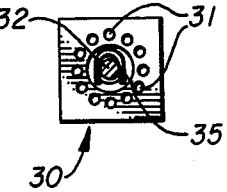
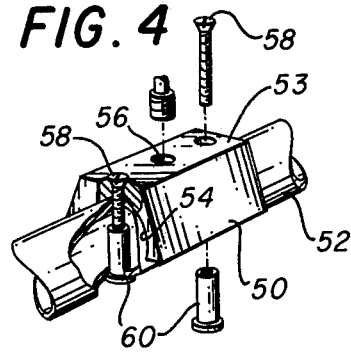

FISHING ROD HOLDER

TECHNICAL FIELD

The present invention pertains to supports for fishing rods and more particularly to an improved fishing rod support having a base permanently affixed to a boat or a dock and an improved rod support body removably connected to the base.

BACKGROUND ART

When using a rod and reel in the sport of fishing, it is sometimes necessary to mount or fix the rod and reel in position extending over the side of the boat or dock. This need arises, for example, when an individual is using more than one rod and reel with the line on each rod baited and suspended in the water. In these situations, the fisherman can attend to only one rod at a time. Consequently, rod holders are utilized to secure the rod in a position extended out over the side of the boat, dock, or the like while the fisherman is manipulating one of the other rods. It is important that the rod holder or support be sturdy to maintain the rod in position when a fish takes the bait and that it provides for adjustment of the position of the rod as required.

Generally available are prior art fishing rod supports or holders which have a c-clamp type mechanism for attaching the holder to the side of a boat or dock. This c-clamp grips a dock railing or side of the boat. These prior art devices have a curved shaped body formed from sheet metal with means for engaging the rod and reel. A wing nut fastener attaches the body to the c-clamp portion of the device. The wing nut allows adjustment of the attitude of the support means. These prior art devices, however, do not provide for a flush permanent installation and do not provide a secure support for the fishing rod.

DISCLOSURE OF THE INVENTION

Therefore, according to the present invention, an improved fishing rod support and holder is provided which in one embodiment has a base designed for a permanent, attractive, recessed mounting on the side of a boat or the like. Means are provided for releasably attaching a rod engaging support body to the recessed base to allow removal of the body portion when the device is not in use. Futher, the fishing rod support of the present invention is provided with a receptacle for receiving and engaging the pistol grip portion of the fishing rod handle to positively retain the fishing rod in position in the holder when in use. In addition, the rod engaging portion of the holder has a generally arcuate shape which slides through a clamping means to allow adjustment of the position of the support. The thickness of the rod engaging portion varies to strengthen the support in the appropriate areas and also to provide a locking engagement with the base.

BRIEF DESCRIPTION OF THE DRAWINGS

For a complete understanding of the present invention and the advantages and features thereof, reference is now made to the accompanying detailed description taken in conjunction with the following FIGURES in which:

FIG. 1 is a perspective view of the fishing rod support of the present invention attached to the side of a boat with a rod supported therein in the position of use;

FIG. 2 is a side elevation of the rod holder of FIG. 1;

FIG. 3A is an exploded perspective view of the clamping means of the embodiment of FIG. 1;

FIG. 3B is a bottom view of the contoured washer 30 of FIG. 3A; and

FIG. 4 is a perspective view of an alternate mounting position configuration for use in attaching the holder to a railing or the like.

DETAILED DESCRIPTION

The fishing rod holder of the present invention is illustrated in the drawings. In these drawings like reference characters are used throughout to indicate like or corresponding parts of the invention.

In FIGS. 1 through 3 one embodiment of the fishing rod holder assembly 10 of the present invention is shown supporting a rod and reel 12 from the railing of a boat 14. The holder 10 is designed so that a portion is permanently affixed to the railing of a boat, dock or the like in a position that it can be used to support a rod and reel 12 in the position shown in FIG. 1 with the line of the rod and reel 12 suspended over the edge of the boat. In this manner, the rod and reel can have a baited line attached thereto which is suspended over the side of the boat while resting in the rod holder assembly 10 without requiring constant attention of the angler during its use. Thus, more than one rod can be baited and placed over the side of the boat simultaneously by one angler. When a fish takes the bait and is hooked, the rod and reel 12 is rigidly held by the rod holder assembly 10 and resists the forces applied to the rod and reel 12 by a fish attempting to free itself from the hook. The rod and reel can be grasped by the fisherman and removed from the holder assembly allowing free use of the rod and reel 12 during landing of the fish.

It is important to note that the rod and reel 12 must be firmly supported by the rod holder assembly 10 during the period of time to prevent the fish from pulling on the rod and reel. In addition, it is desirable that the holder 10 provides for varying the attitude and position the rod and reel 12 when suspended over the side of the boat. The rod holder assembly 10 of the present invention is provided with adjustment means for altering the position of the rod and reel 12 and such adjustment means is sufficiently stable to retain the rod and reel in position even when forces are applied to the rod and reel by a fish or during movement of the boat.

The improved rod holder assembly 10 of the present invention comprises two main portions, i.e., a rod supporting or rod engaging body member 16 and a base 18 to which the body 16 is connected by clamping means assembly 19. According to a particular feature of the present invention, the base 18 is designed so that it may be mounted in a recessed position as shown in FIG. 2. The base 18 comprises a plate 20 forming a support surface on the upper surface thereof. The plate 20 has a central bore 22 therein. On the underside of the plate 20, an internally threaded cylindrical member 24 is affixed in axial alignment with the bore 22. A plurality of bores 26 are provided for utilizing suitable fasteners to attach the base 18 to a surface such as the side of a boat 14. As shown in FIG. 2, the cylindrical portion 24 is mounted in a recessed position inserted through a clearance opening 28 formed in the side 14. Bores 26 are preferably countersunk to allow the use of a countersunk fastener recessed in the upper support surface of the plate 20. In addition, the plate 20 can be recessed with its support surface flush with the side of the boat.

A contoured washer 30 is positioned as shown in FIG. 2 on top of the support surface of plate 20. Contoured washer 30 has a concave surface which conforms to the curvature of the underside of the body 16 as will be described in more detail hereinafter. The washer 30 has a clearance opening for a wing bolt 32. Bolt 32 extends through the washer 30 and threadedly engages the threads of the cylinder 24 to retain the body 16 in place. An upper retaining washer 34 is positioned on the upper surface of body 16 as is engaged by the wing bolt 32. Washer 34 has two small tabs 36 which extend into a slot 38 formed in the rod engaging member 16. This slot 38 extends through a substantial portion of the center of the body 16 and permits adjustment of the position of the body 16 and allows clamping of the same in position by tightening the wing bolt 32. As shown in FIGS. 3A and 3B, the bottom surface of the contoured washer 30 has a plurality of indentations 31 for engaging the two raised members 33 extending from the upper surface of the base 18. A spring clip 35 surrounds the threaded end of wing bolt 32 extending through the washer 30 to prevent the washer 30 from becoming separated from the body 16. The wing bolt 32 may be loosened to enable the body 16 to be rotated and set to a new position through the cooperation of the raised members 33 with a pair of indentations 31 on the washer 30.

According to a particular feature of the present invention the body 16 has a varying thickness along the length thereof (as can best be seen in FIG. 2). As is shown, the thickness varies from a minimum of A to a maximum of B moving from left to right as seen in FIG. 2. It is noted that the maximum B occurs at or near the center of the curved portion of the body 16. The thickness varies continuously from the left-hand end to a maximum at or near the center of the body 16. This maximum thickness B as is shown in FIG. 2 is at or near the position where the wing nut would retain the body 16 in a rod mounted therein in a near to level position. In addition, the body 16 varies in thickness from the maximum B to a second minimum C at the right hand end of the body 16. This thickness varies continuously along the length of the body 16 to the right-hand end as viewed in FIG. 2.

The variation in thickness of member 16 along its length provides strength in the portion where maximum stress occurs and reduces the weight of the support. According to another aspect of the present invention, the thickness of the body 16 varies from left to right along the length of the slot 38. In addition, the thickness decreases between the center maximum B and the point D illustrated in FIG. 2 as the left-hand extremity of the slot 38. This variation in thickness in this area provides the additional function of jamming or locking the clamping assembly formed by the wing bolt 32 when a force is applied to the fishing rod 12, for example, by a fish.

The body 16 is also provided with suitable mounting surface structure for supporting the rod and reel 12 therein. The right-hand end of the body 16 as is seen in FIG. 2, has a bifurcated portion 40 forming a slot 41 into which the upper end of the handle of the rod rests. The left-hand end of member 16 as viewed in FIG. 2 forms a loop 42 through which the butt of the rod handle extends. This loop 42 retains the rod handle in position and resists forces applied to the rod by fish.

According to a particular feature of the present invention, a socket means 44 is formed in the body 16 as shown. This socket means 44 is of a size to receive the pistol grip portion 46 of the rod handle therein. This socket prevents rotation of the rod about the axis of the rod. The distance E (between the top of or upper extremity of the inside of loop 42 and upper extremity or surface of socket means 44) is designed to be less than the distance between the upper surface of the handle and the lower extremity of the pistol grip portion 46. This spacing provides a locking function which holds the rod within the body 16. Thus, the socket means 44 prevent the rod from being removed until the rod is rotated to the position 12' shown in phantom lines wherein the pistol grip 46' clears the upper surface of the socket means 44.

The rod holder of the present invention provides a means for attaching a rod to the side of a boat or dock or the like in a rigid and secure manner. If desired, the wing bolt 32 can be loosened and body 16 and washers 34 and 30 removed leaving only the base 18 on the edge of the boat when the holder is not in use. Disassembled the holder 10 can be stored out of view and the base 18 can be formed of a decorative material, such as chrome or the like. The shape of the body 16 is such that resists high stresses. The clamp operates in a manner to jam or lock such that rotation of the body 16 is resisted when a fish applies a force to the rod. In addition, the particular structure of the body 16 locks the pistol grip of the rod to retard dislodgement of the rod from the holder.

A second embodiment of the base for attaching the assembly is illustrated in FIG. 4. In this embodiment a base 50 is attached to the railing 52 of a boat, dock or the like. This base 50 has an upper support surface 53 and a lower contoured surface 54 of a size and shape to receive the railing 52 therein. In the embodiment shown, the base 50 has a centrally positioned internally threaded bore 56 extending downwardly. The threaded bore 56 receives the wing bolt 32. Bores 58 are provided for fasteners to attach the base 50 to the tubing 52. In the embodiment shown, threaded rivets 60 are used, but it is to be understood, of course, that other types of fasteners could be utilized to attach the holder of the present invention to the railing.

Within the scope of the present invention, it is anticipated that other types of bases could be used with the improved body 16 of the present invention. It is envisioned the self-locking clamping structure could be utilized with various types and shapes of bases. It is to be understood, of course, that other alterations and modifications of the present invention can be made without departing from the spirit and scope of the present invention as defined in the appended claims.

I claim:
1. A fishing rod support comprising:
 a base for attachment to a structure, the base having a support surface, a threaded opening in said base centrally positioned to extend into said support surface, clearance openings in said base to receive recessed fasteners through said openings to attach said base to said structure, said base being of a shape to accommodate the recessed mounting thereof in said structure with the support surface flush with the surface of said structure;
 clamping means releasably attached to said base, said clamping means comprising a washer having a flat surface on one side and a contoured surface on the other side, a guide washer having tab means thereon, a threaded fastener means extending through said washers and threadedly engaging said opening in said base; and an elongate arcuate support body, an elongate slot formed in said body of a size to receive said fastener therethrough with said guide washer positioned on the concave side of said body and with the tab thereon extending into said slot, said contoured washer positioned with its contoured surface contacting the convex side of said body and the flat side of said contoured washer contacting said support surface whereby said fastener means can be used to releasably clamp said body in position on said base, a socket means in said body for engaging the pistol grip of said rod when said rod is supported on said body, a loop formed in said body at one end thereof, said loop being of a size and shape to receive the butt of said rod therethrough, a bifurcated portion formed on said body at the end opposite said loop to allow said rod to rest therein.

2. The fishing rod support of claim 1, and further comprising:

said arcuate support body increasing in thickness along said elongated slot portion from said loop to said bifurcated portion whereby said clamping means resists movement of said support from a downwardly directed force at said bifurcated portion holding the rod tip.

* * * * *